Nov. 10, 1970  S. KASAKOFF  3,539,355

COFFEE FILTER BAG

Filed June 28, 1967

INVENTOR
SAM KASAKOFF

ATTORNEY

Nov. 10, 1970     S. KASAKOFF     3,539,355
COFFEE FILTER BAG
Filed June 28, 1967     2 Sheets-Sheet 2
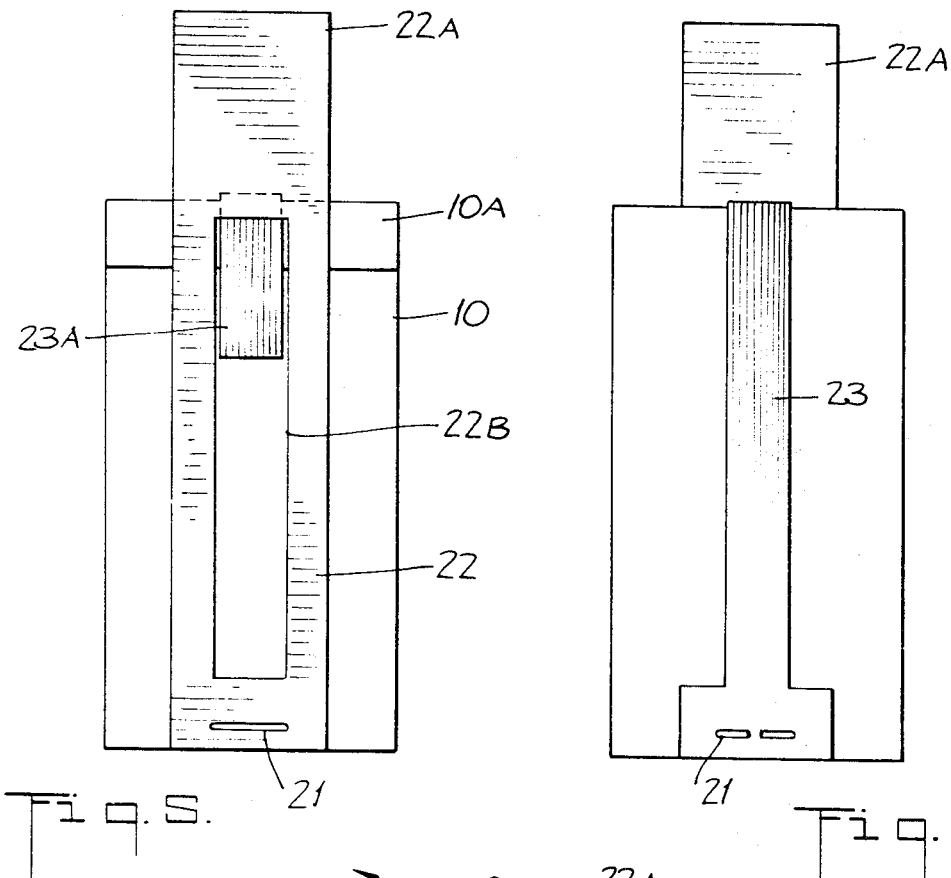
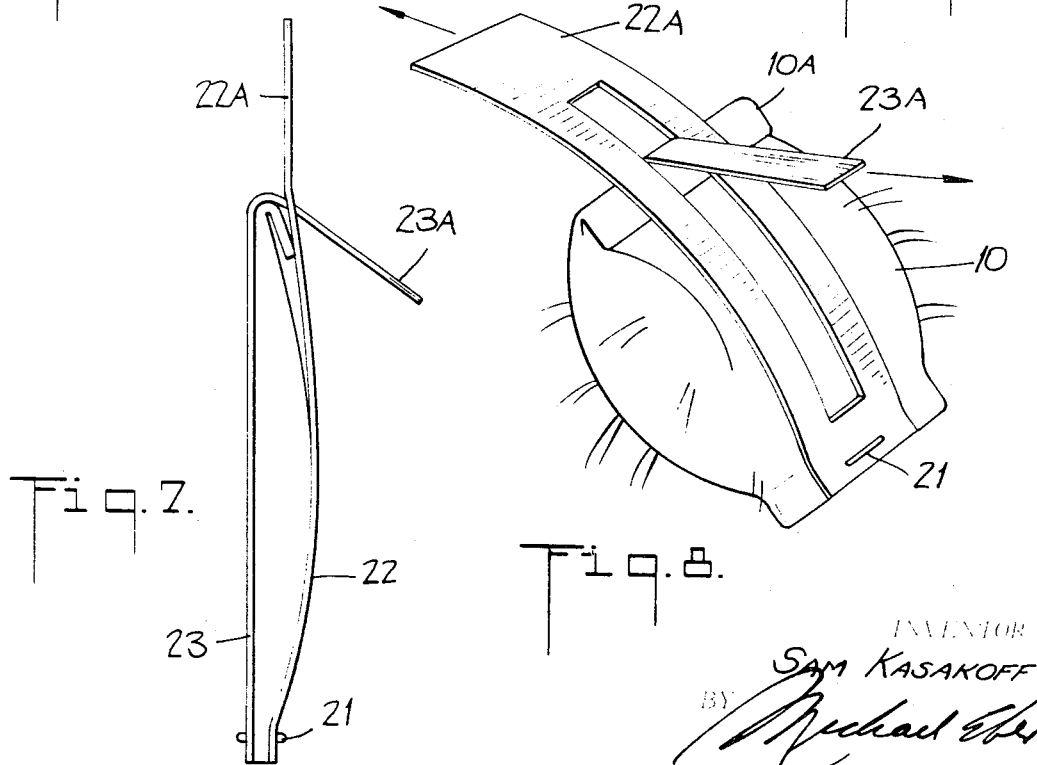
INVENTOR
SAM KASAKOFF
BY Michael Ebert
ATTORNEY United States Patent Office 3,539,355
Patented Nov. 10, 1970

3,539,355
COFFEE FILTER BAG
Sam Kasakoff, 329 E. 58th St.,
New York, N.Y. 10022
Continuation-in-part of application Ser. No. 570,557,
Aug. 5, 1966. This application June 28, 1967, Ser.
No. 649,557
Int. Cl. B65b 29/02
U.S. Cl. 99—77.1                    3 Claims

ABSTRACT OF THE DISCLOSURE

An open and expansible filter bag containing a charge of ground coffee and adapted when in use to also contain a substantial volume of water is enclosed within a protective envelope. The bag includes means which will close and compress the bag so that the water is subjected to pressure to express the resultant brew through the filter.

RELATED APPLICATION

This application is a continuation-in-part of my copending application Ser. No. 570,557, filed Aug. 5, 1966 now issued as Pat. No. 3,370,524.

This invention relates generally to coffee makers, and more particularly to an improved coffee-maker, which includes a compressible filter bag which is adapted efficiently and quickly to brew ground coffee to produce a beverage of high strength and quality.

Coffee beans must be carefully roasted before they are ready for the consumer. Roasted coffee contains about 1% to 2% of the alkaloid, caffein, which acts as a cerebral stimulant. While coffee contains glucose, dextrin and protein, its aroma is due primarily to an oily substance, known as caffeol, which quickly oxidizes when exposed to air. It is for this reason that modern vacuum packing techniques are used to preserve the flavor and aroma of coffee.

Various techniques are currently used to brew coffee. The simplest is the so-called pot method, wherein the ground coffee is deposited in a pot of boiling water which is allowed to steep until a liquid of the proper concentration is produced. The drawback to this method is that one must wait until the essences are extracted and the coffee grounds settle, otherwise the grounds and the liquid are intermingled and the beverage is bitter and unpleasant to the taste. On the other hand, since the grounds remain in the liquid, a point is reached where the coffee concentration is excessive and oils are boiled out, thereby producing a disagreeable flavor. Thus the quality of pot coffee is difficult to control.

In the drip method, boiling water is poured over the coffee grounds in a double container and the resultant beverage trickles through pores in the upper container to flow into the lower container. While this method produces coffee of good quality, it is cumbersome and slow. The well-known percolator method is somewhat slower and since in this technique the boiling beverage is recirculated through the coffee grounds, the aromatic oils are volatilized and the resultant beverage is relately insipid.

The filter method is similar to the drip method except that the coffee grounds are deposited in a funnel-shaped paper filter which is permeable only to the beverage. This method is also very slow, for the coffee grounds tend to clog the pores of the filter and no pressure exists to accelerate the slow trickle of the beverage through the filter. Nevertheless, this method has attained some degree of success in that the resultant coffee is of excellent quality.

It is important to bear in mind that when brewing with continuously boiling water, live steam or recirculating hot water, the aromatic oils are volatilized and the coffee is rendered flat. But when brewing with water brought to the point of boiling, the coffee is of far better quality but the brewing process is ordinarily much slower. Hence existing brewing techniques which are slow produce superior coffee and those which are fast produce an inferior beverage. The fastest way to make coffee is by using coffee powder, but such socalled instant coffee is of very poor quality in that when converting a brewed liquid coffee into crystalline powder for later use with heated water, most of the aromatic constituents are lost.

In my copending application, above-identified, there is disclosed a coffee brewer capable of brewing a beverage of exceptional quality almost as quickly as it takes to make instant coffee. This brewer is constituted by a filter bag formed of filter paper or other material permeable to liquid, the pores of the bag being sufficiently minute to entrap ground coffee held in the bag. Wires or other deformable means are secured to the mouth of the bag, whereby the mouth may selectively be opened or sealed by deformation of the wires.

In the brewing operation, a standard measure of ground coffee is added to the bag and boiling water is poured thereover, the water extracting the essences from the grounds and seeping through the filter bag into the cup. To accelerate brewing and to subject the liquid to pressure, the wires are pulled by their extensions to seal the bag, the wires then being rotated to wind the bag into a roll and thereby to express the liquid from the filter.

The reason why filter techniques of the type heretofore known were slow, is because of the absence of pressure, as a consequence of which the seepage of liquid through the filter medium is gradual and becomes progressively slower as the filter clogs. But with the invention disclosed in said copending application, the liquid flowing through the filter bag is subjected to pressure which accelerates the extraction of coffee essences from the grounds held in the filter bag. Thus the brewing process is accelerated without a concomitant loss of quality.

The primary object of the present invention is to provide a filter bag which contains a charge of ground coffee and which includes means to close and compress the bag to effect brewing, the bag and the coffee therein being enclosed in a sealed envelope to preserve the quality of the coffee until such time as the bag is put to use.

More specifically, it is an object of my invention to provide a filter bag for brewing coffee by the pressurized flow of hot water through the grounds of coffee to accelerate the extraction and homogenization of coffee essences therefrom, and to produce in a matter of seconds a full-bodied liquid coffee of high strength.

Briefly stated, in a preferred embodiment of the invention, coffee is brewed by means of a bag formed of porous paper or other filtration medium, the bag containing a measured charge of ground coffee sufficient to make a predetermined high-strength coffee, the bag being housed in a removable envelope to hermetically seal the contents until such time as the bag is put to use. The filter bag is provided with drawstrings or equivalent means which act to close the bag after it has been placed in a cup and filled with boiling water to initiate a brewing action. Thereafter, the drawstrings are further drawn to contract the size of the bag and thereby apply pressure thereto which serves to express the coffee brew through the filter medium into the cup.

For a better understanding of the invention as well as other objects and further features thereof, reference is made to the following detailed description to be read in conjunction with the accompanying drawing, wherein like elements in the several figures are identified by like reference numerals. In the drawings:

FIG. 5 is a front view of another embodiment of a filter bag according to the invention;

FIG. 6 is a rear view of this bag;

FIG. 7 is a side view of the bag in the static condition; and

FIG. 8 shows the bag under compression.

Figure 1:
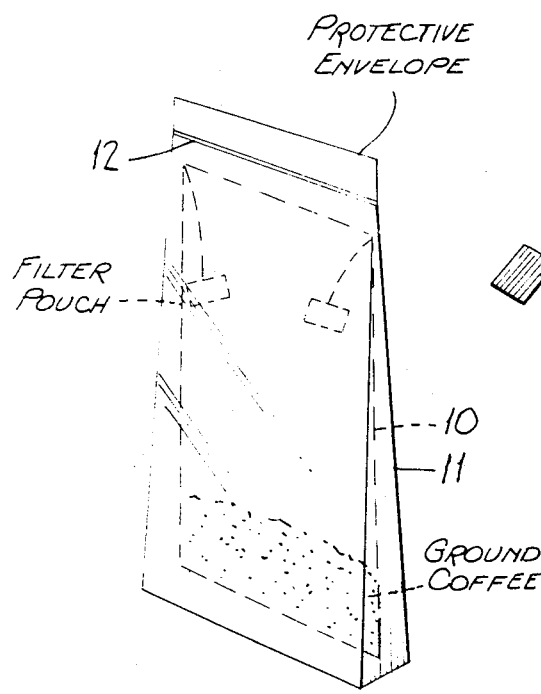
FIG. 1 is a perspective view of an envelope containing a coffee filter bag in accordance with the invention.

Referring now to the drawing, and more particularly to FIG. 1, there is shown a filter bag generally designated by numeral 10, which is enclosed in a hermetically sealed envelope 11 having a tear-seal 12 or other means to open the envelope. Envelope 11, which may be formed of polyethylene, Mylar or similar film material, has a rectangular shape and dimensions sufficient to accommodate the bag.

Figure 2:
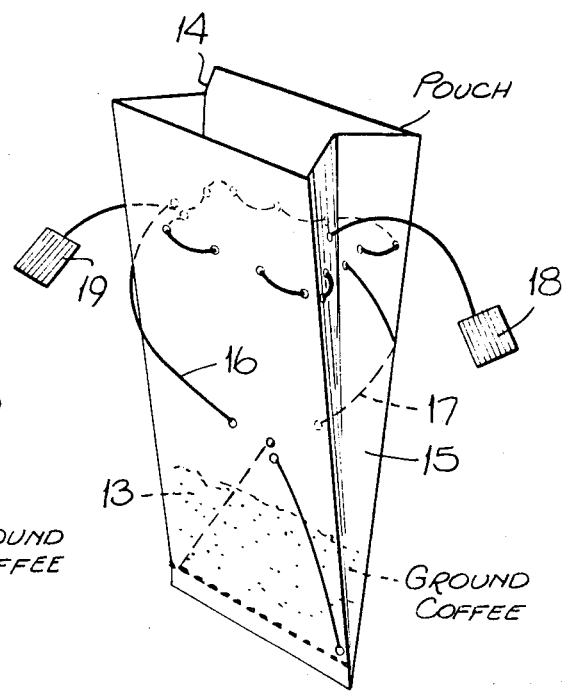
FIG. 2 shows in perspective the bag after it is removed from its envelope.

Bag 10, as shown separately in FIG. 2, is formed of filter paper or cellulosic material having high wet-strength, the pores of the filter medium being sufficiently minute to prevent the particles of ground coffee held in the bag from passing therethrough. Preferably the grounds are in finely pulverized form to obtain a quick brewing action. The dimensions of the bag are appropriate to the amount of coffee to be brewed, and in practice, small bags may be used to brew a single cup of coffee. It will be apparent that a whole range of bag sizes is feasible to make any desired quantity of coffee.

The bag 10 is open-topped and is provided with side gussets 14 and 15 which permit expansion of the bag when put to use. To close the bag and to contract it, there are provided a pair of drawstrings 16 and 17. String 16 is anchored to the base of the bag at the right side thereof, and is threaded diagonally along the front panel of the bag and then across the rear panel adjacent the mouth, the string terminating in a pull tag 18. String 17 is anchored to the base of the bag at the left side thereof and is threaded diagonally along the rear panel of the bag and then across the front panel, this string terminating in a pull tag 19. Thus when both strings are pulled, the mouth of the bag is first caused to close and as the strings continue to be pulled, they cause the bag to contract as the base thereof is forced by the strings toward the mouth.

Figure 3:
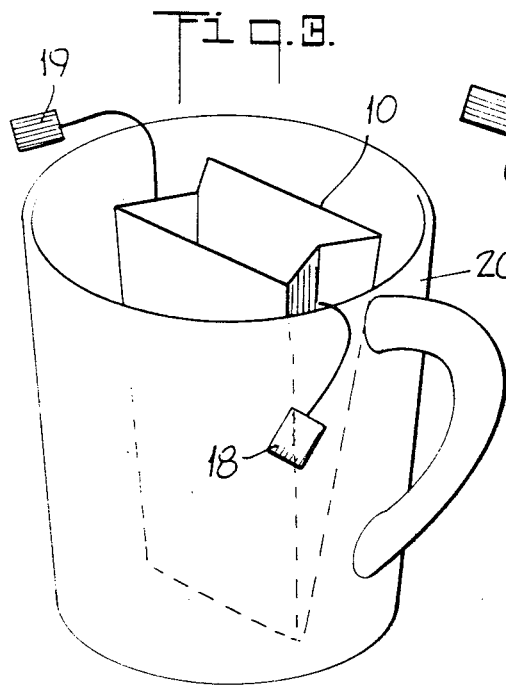
FIG. 3 illustrates the bag after it is placed in a cup and filled with boiling water.
Figure 4:
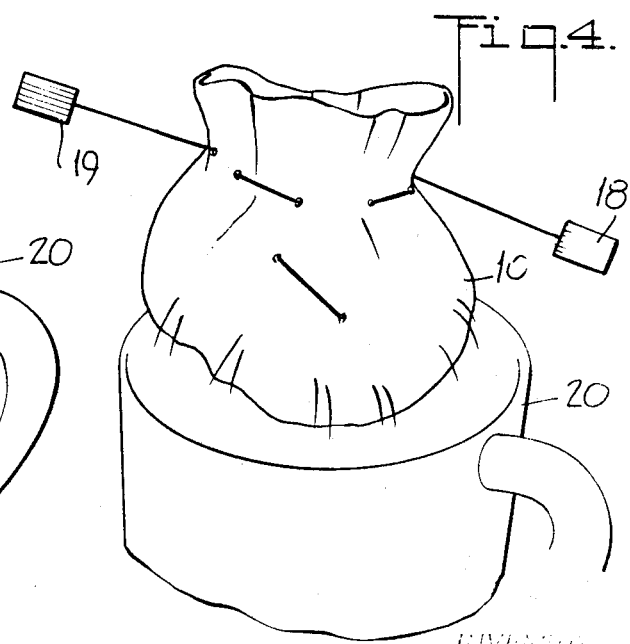
FIG. 4 shows the bag after it has been contracted to express the brew into the cup.

In practice, after the outer envelope 10 is removed, the bag, with the charge of coffee therein and with its mouth open, is placed within a suitable receptacle, such as cup 20, as shown in FIG. 3. Boiling water is then poured into the bag, the water also entering the cup about the bag to fill the cup to the desired height. The ground coffee within the bag interacts with the boiling water to initiate the preparation of a brew. After about a half-minute of brewing time, the user then proceeds to pull on tags 18 and 19. In doing so, he locks the water within the bag, and as he continues to pull, the resultant contraction of the filter bag applies a pressure to the entrapped water, the water being forced out of the pores of the filter, as shown in FIG. 4.

The pressurized flow of water through the ground coffee accelerates the extraction and homogenization of coffee essences therefrom, and in a matter of a few seconds, a full-bodied liquid coffee of high strength and quality fills the cup. Since the spent coffee grounds are contained in the enclosed bag, the bag may be readily discarded, and no cleanup is necessary after brewing in the manner described.

The actual amount of time it takes to brew a full-bodied cup of coffee, depends on the fineness of the coffee, the porosity characteristics of the filter medium, as well as the rate at which pressure is applied. In practice, the total time can be reduced to a minute or less, although a greater period may be allowed for a stronger brew. In any event, the total brewing time is far shorter than any known filter techniques, in that one is able to obtain the advantages of filtration without the usual drawbacks.

The high-speed characteristics of the technique minimizes heat loss, so that the brewed coffee is very hot, which is often not the case when the much slower conventional filter techniques are used.

It is to be noted that the drawstrings need not be threaded into the filter bag, and may be attached thereto by staples or similar means. Also, instead of drawstrings, the filter-paper bag may be held within an open-mesh structure which is capable of contraction when the threads thereof are pulled.

Referring now to FIGS. 5, 6, 7 and 8, there is shown another embodiment of a filter bag in accordance with the invention, with a paper strap arrangement for compressing the filter bag or pouch. The bag 10 shown in these figures is identical to that in FIGS. 1 to 4, except that the mouth portion is provided with a fold which when bent over forms a closure flap 10A.

In order to contract the bag after it is filled with hot water, a stiff paper strap is provided which is stapled by staple 21 to the bottom of the bag, the strap having a broad-band half-section 22 which extends the full length of the bag at the front thereof and beyond to provide a first tab 22A, a rectangular slot 22B being cut longitudinally in the broad band. The strap has a narrow-band half-section 23 which extends along the back of the bag, the end portion of this section being bent over the closure flap 10A and being admitted through slot 22B in the broad-band section, whereby the two halves of the strap encircle the bag, the end portion of the narrow-band section 23 forming a second tab 23A.

To use this filter bag, which has a charge of ground coffee 13, the bag is first opened by unfolding the flap 10A, the open bag being placed in a container, as in FIG. 3. It is then filled with boiling water and the flap 10A is closed. After a brief interval, sufficient to allow initial brewing, the first and second tabs 22A and 23A are pulled in opposite directions, as shown in FIG. 8, thereby subjecting the filled bag to pressure and expressing the brew through the porous filter medium into the container.

Thus the operation is essentially the same as that previously described, the difference lying only in the means to compress the bag.

While there have been shown and described preferred embodiments of coffee filter bag in accordance with the invention, it will be appreciated that many changes and modifications may be made therein without, however, departing from the essential spirit of the invention as defined in the annexed claims. Thus the outer protective envelope which serves to keep the ground coffee fresh, may be composed of aluminum foil which is coated with a thermoplastic lining, the envelope being sealed by heat and pressure to fuse the lining material.

What I claim is:
1. A coffee bag assembly comprising:
 (a) a normally open and expansible bag formed of liquid-permeable filter material, said bag having a capacity, when expanded, to contain a substantial volume of water,
 (b) a charge of ground coffee contained in said open bag, whereby liquid coffee is brewed by filling the open bag in the expanded state with boiling water, (c) an envelope enclosing said charged open bag and provided with a removable seal, and (d) means coupled to said open bag sequentially to cause closure thereof and to effect contraction of the closed bag constituted by a strap which encircles the bag and is secured thereto, one half of the strap having a broad band with a longitudinal slot therein, the other half having a narrow band which extends through said slot such that when the ends of the halves are pulled in opposite directions the bag is compressed whereby the water is subjected to pressure to express the resultant coffee brew through the filter.

2. An assembly as set forth in claim 1, wherein said bag is made of high wet-strength paper.

3. An assembly as set forth in claim 1, wherein said envelope is formed of thermoplastic sheeting.

References Cited
UNITED STATES PATENTS

| | | | |
|---|---|---|---|
| 2,881,910 | 4/1959 | Murphy | 99—77.1 X |
| 2,925,171 | 2/1960 | Eaton | 99—77.1 X |
| 3,215,533 | 11/1965 | Rambold | 99—77.1 |
| 3,279,926 | 10/1966 | Aguirre-Batres | 99—77.1 |

RAYMOND N. JONES, Primary Examiner

S. B. DAVIS, Assistant Examiner

U.S. Cl. X.R.
99—287